(12) United States Patent
Renyer et al.

(10) Patent No.: US 8,393,502 B2
(45) Date of Patent: Mar. 12, 2013

(54) SEED METERING GATE ASSEMBLY

(75) Inventors: Jim Renyer, Sabetha, KS (US); Greg Renyer, Sabetha, KS (US)

(73) Assignee: USC, L.L.C., Sabetha, KS (US)

( * ) Notice: Subject to any disclaimer, the term of this patent is extended or adjusted under 35 U.S.C. 154(b) by 327 days.

(21) Appl. No.: 12/841,735

(22) Filed: Jul. 22, 2010

(65) Prior Publication Data

US 2012/0017812 A1    Jan. 26, 2012

(51) Int. Cl.
*B65D 55/00* (2006.01)
*B65D 90/02* (2006.01)
*B67D 3/00* (2006.01)
*B67D 7/06* (2010.01)
*B67D 47/00* (2006.01)

(52) U.S. Cl. ......... 222/528; 222/544; 220/565; 220/211

(58) Field of Classification Search .......... 111/130–133, 111/11–13, 170, 186–188, 200; 222/526–529, 222/544, 559; 220/565, 200, 211, 890
See application file for complete search history.

(56) References Cited

U.S. PATENT DOCUMENTS 6,058,860 A * 5/2000 Kinkead et al. ................. 111/11
6,338,626 B1 * 1/2002 Saeki ............................ 432/243

\* cited by examiner

*Primary Examiner* — Christopher J. Novosad
(74) *Attorney, Agent, or Firm* — Hovey Williams LLP

(57) ABSTRACT

A seed metering gate assembly (12) is provided for use with an upright seed bin (10) having a shiftable primary gate (24), wherein the gate assembly (12) provides an additional seed flow control function allowing more accurate dispensing of seed from the bin (10). The gate assembly (12) includes a seed hopper (13) equipped with a fore and aft-shiftable metering gate (42) movable between a closed position and an open position presenting a seed output passageway (40). Apparatus (62) is operably coupled with the gate member (42) in order to determine the travel of metering gate member between the fully closed position and a plurality of open positions presenting respective, differently sized passageways (40). The apparatus (62) preferably includes a rod (64) having a series of through openings (70) and coupled with the gate member (42), with a shiftable, motion-limiting collar (72) mounted on the rod (64) and securable at any of the openings (70) by a clip (76). The opening movement of the rod (64) is limited by engagement between the collar (72) and a bracket (68) affixed to hopper (13).

14 Claims, 5 Drawing Sheets

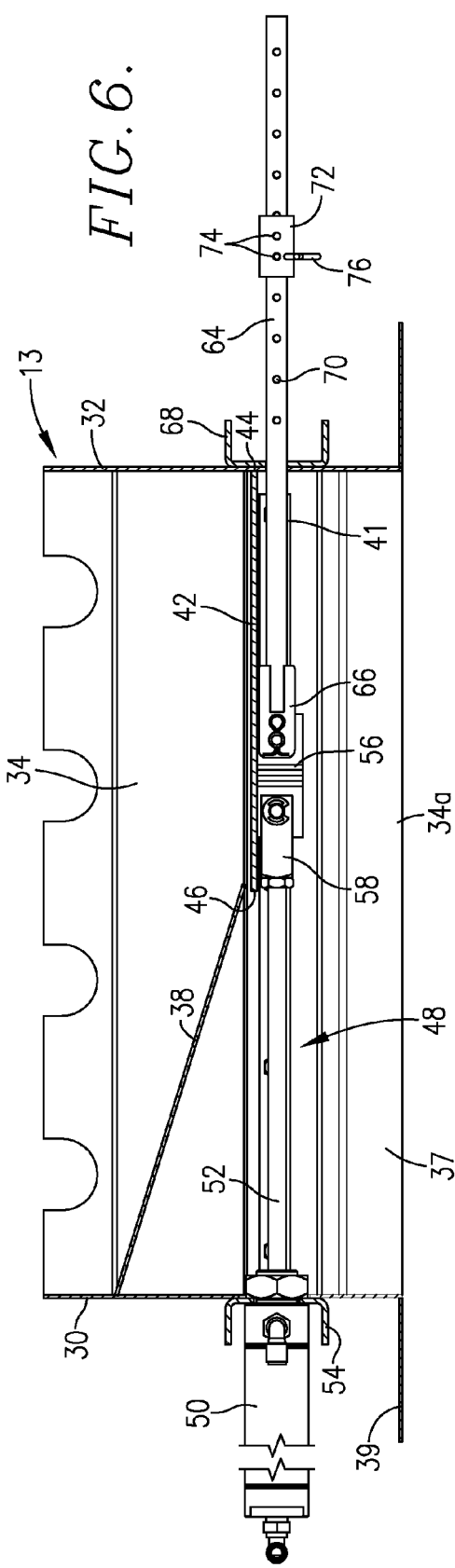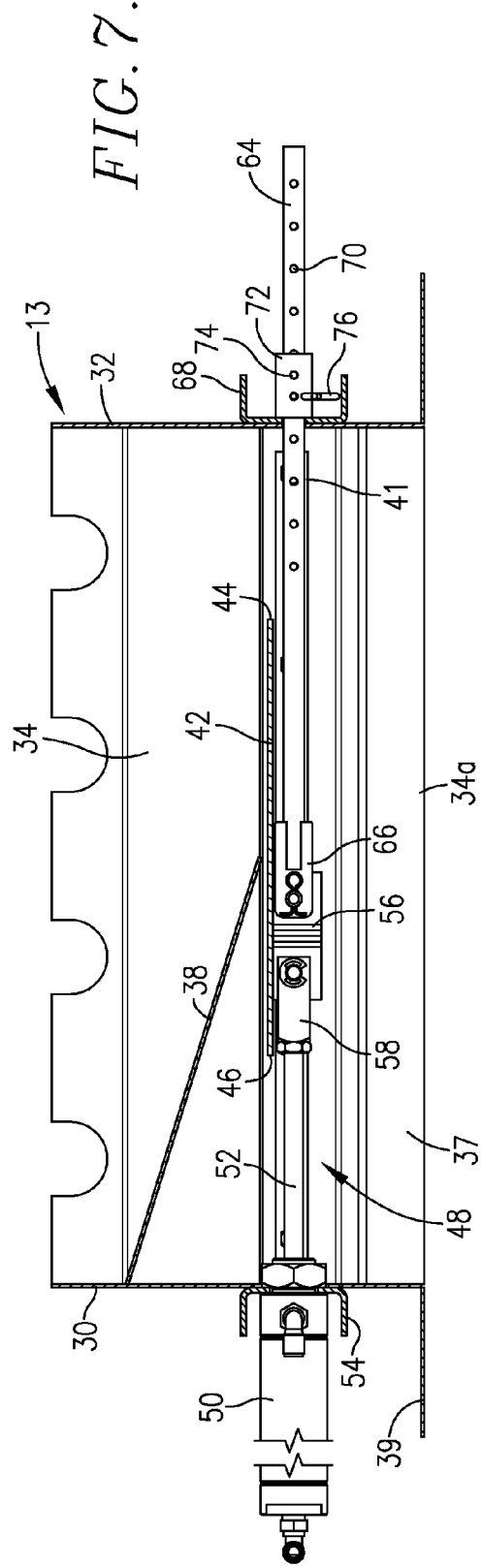

SEED METERING GATE ASSEMBLY

BACKGROUND OF THE INVENTION

1. Field of the Invention

The present invention is broadly concerned with seed bins and metering gate devices used therewith in order to permit accurate dispensing of seed quantities. More particularly, the invention is concerned with such bins and devices wherein the metering gate includes a shiftable outlet gate member and apparatus to limit the travel of the gate member to a predetermined position for accurate seed dispensing.

2. Description of the Prior Art

Seed dealers commonly store quantities of various seeds in individual, upright seed bins, each holding several tons of seed. These bins typically include an upright cylindrical primary section along with a frustoconical outlet section for delivery of seed to an underlying conveyor belt or similar expedient. The frustoconical sections of the bins are provided with a movable, primary gate allowing flow of seed from the bin. A secondary gate assembly is provided beneath the primary gate, which receives seed upon opening of the primary gate. The secondary gate assembly has a hopper along with a flat, shiftable gate member which is moved between closed and open positions by means of a piston and cylinder assembly, in order to create a delivery passageway. In practice, the primary gate is opened to a desired degree, and the secondary gate is fully opened for a time interval estimated to dispense the requisite amount of seed.

A significant problem with these bins and seed delivery devices is the inability to accurately dispense quantities of seeds. Shifting of the primary gate necessarily creates an at least partially arcuate seed flow opening, owing to the circular cross-section of the frustoconical outlet section of the bin. Seed from this arcuate opening is then delivered to the fully opened underlying secondary gate assembly. Thus, the rate of seed flow from the bin is determined solely by the position of the primary circular gate, with no flow control provided by the secondary gate assembly. Experience has proved that the primary gate cannot be accurately and reproducibly positioned so as to deliver seed at the same rate during each opening thereof. Thus, either too much or too little seed may be dispensed during identical gate-open intervals.

SUMMARY OF THE INVENTION

The present invention overcomes the problems outlined above and provides an improved metering gate assembly for use with seed bins. The metering gate assembly hereof includes a hopper having an upper end and a lower output end, with a slidable metering gate member oriented for selective movement between a fully closed position preventing flow of seed from the lower output end, and an open position presenting a passageway permitting flow of seed from the lower output end. Mechanism such as a piston and cylinder assembly is operably coupled with the metering gate in order to selectively move the gate between the closed position and open positions. Importantly, apparatus is operably coupled with the metering gate member in order to determine the travel of the metering gate member between the fully closed position and a plurality of open positions each presenting a respective, differently sized open passageway, wherein each of the open passageways is substantially quadrate (e.g., square or rectangular) in plan configuration. In this way the metering gate assembly provides a separate means of controlling the rate of seed flow, apart from the position of the primary gate.

Preferably, the gate positioning apparatus comprises an elongated rod having a series of axially spaced apart connection elements thereon and secured to the metering gate member and extending forwardly from the forward margin thereof. The rod and metering gate member are selectively shiftable in a forward direction until the forward margin of the slidable gate member reaches the closed position. Moreover, the rod and metering gate member are selectively shiftable in a rearward direction in order to move the slidable gate member towards the fully opened position thereof. A bracket slidably receives the forward end of the rod, and a motion-limiting coupler is operably secured to the rod and attachable at any one of the connection elements. The coupler is operable to engage the bracket when the rod and metering gate member are shifted rearwardly, in order to selectively limit the size of the corresponding seed passageway.

BRIEF DESCRIPTION OF THE DRAWINGS

FIG. 6 is a fragmentary vertical sectional view of the metering gate assembly, illustrating the slide plate in the full closed position thereof; and FIG. 7 is a fragmentary vertical sectional view similar to that of FIG. 6, but depicting the slide gate in one of the open positions thereof to permit flow of seed from the metering gate assembly.

DETAILED DESCRIPTION OF THE PREFERRED EMBODIMENT

Figure 1:
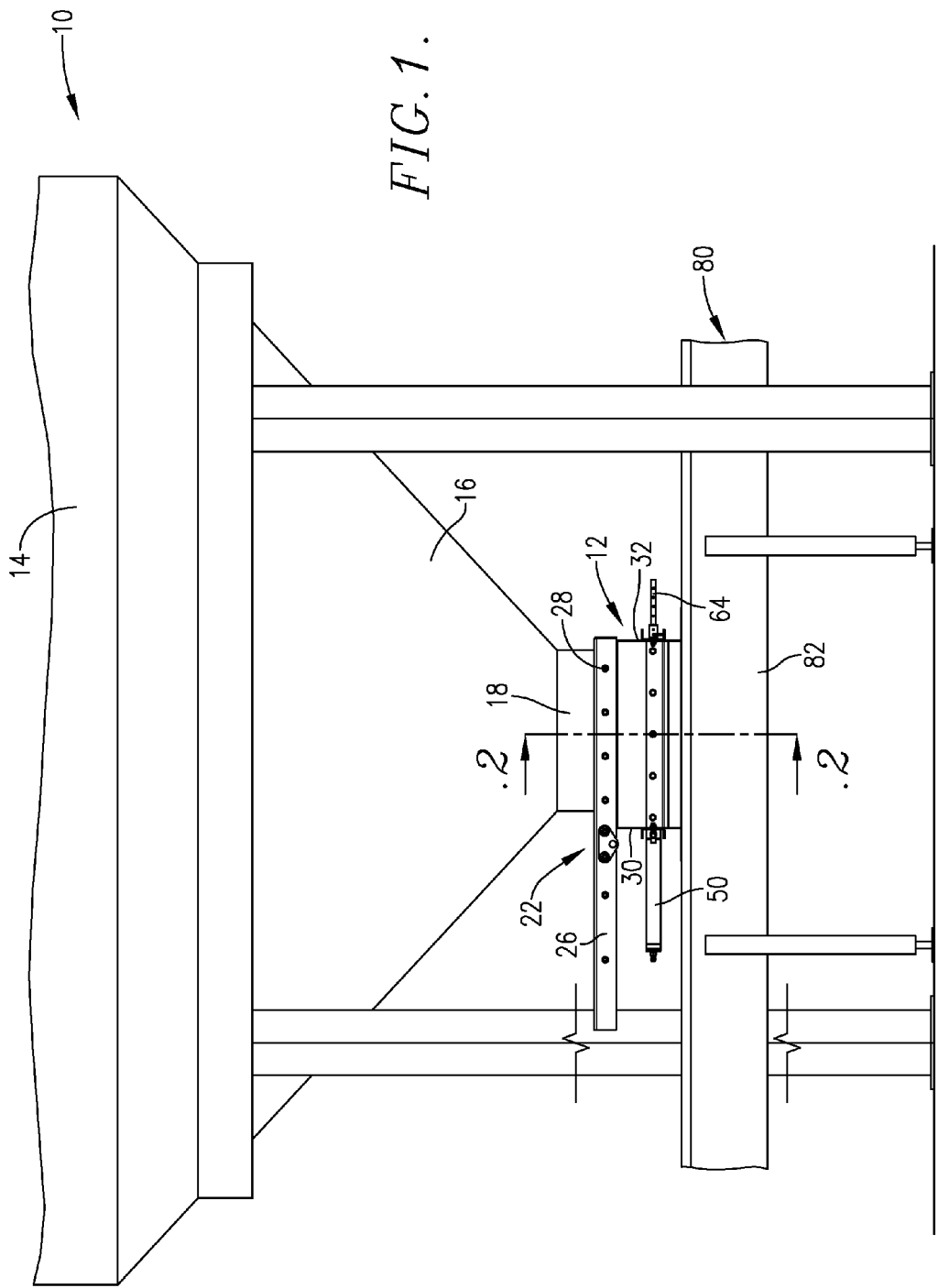
FIG. 1 is a fragmentary side view of a standard seed bin with the metering gate assembly of the invention secured to the lower outlet end of the bin.

Turning now to the drawings, a seed bin 10 is illustrated in FIG. 1, equipped with a metering gate assembly 12 in accordance with the invention. The bin 10 includes a large cylindrical, upright body 14 with a frustoconical lower section 16 terminating in a downwardly extending tubular chute 18 defining a circular outlet opening 20. A primary delivery gate assembly 22 is positioned across opening 20 and includes a shiftable flat plate 24 slidable within a frame 26. The plate 24 is illustrated in its closed position in FIGS. 1 and 2. It will be appreciated, however, that the plate 24 may be shifted to create a seed outlet of variable dimensions. This outlet is necessarily arcuate in plan configuration, owing to the circular cross-section of the lower bin section 16.

Figure 2:
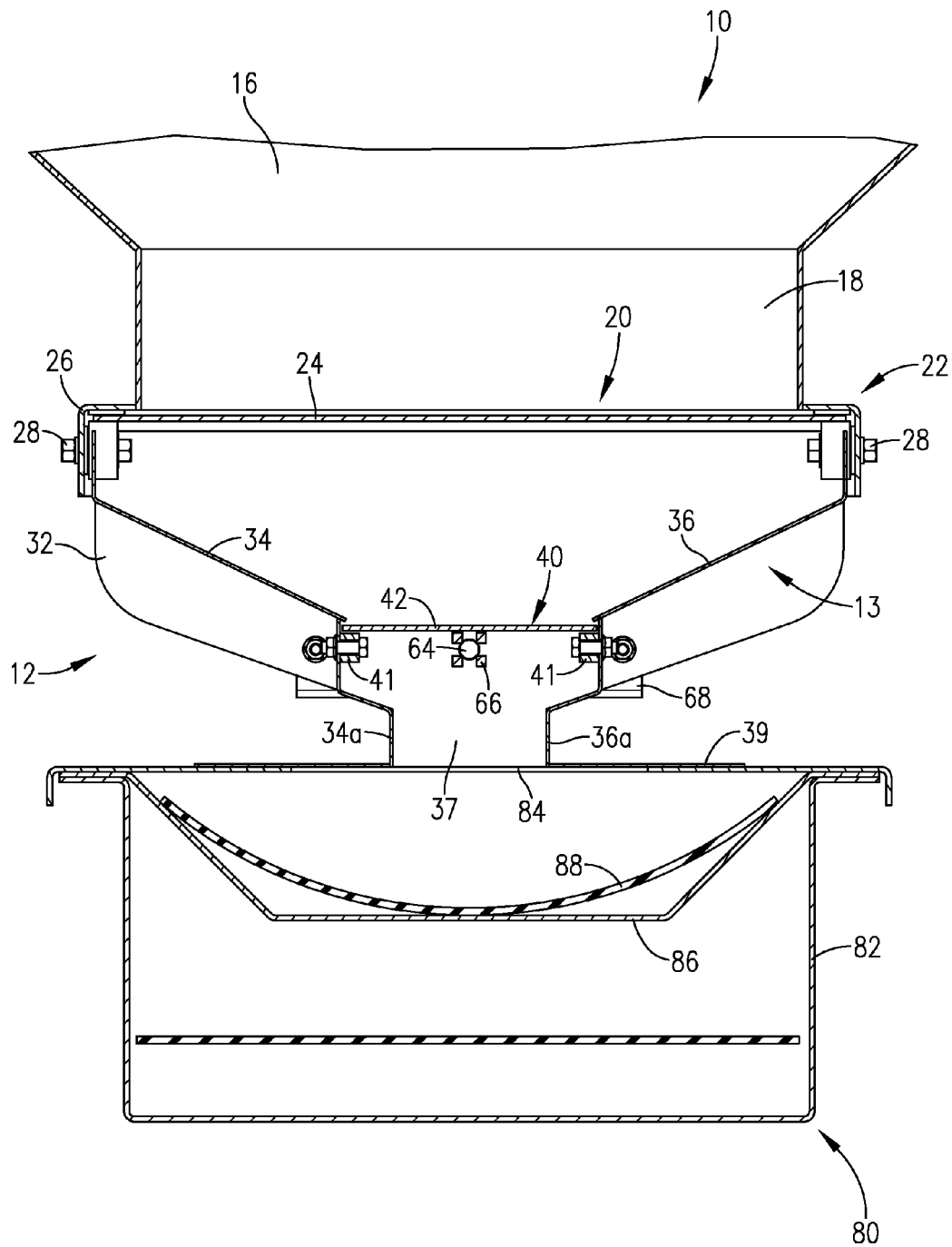
FIG. 2 is a vertical sectional view taken along line 2-2 of FIG. 1.
Figure 3:
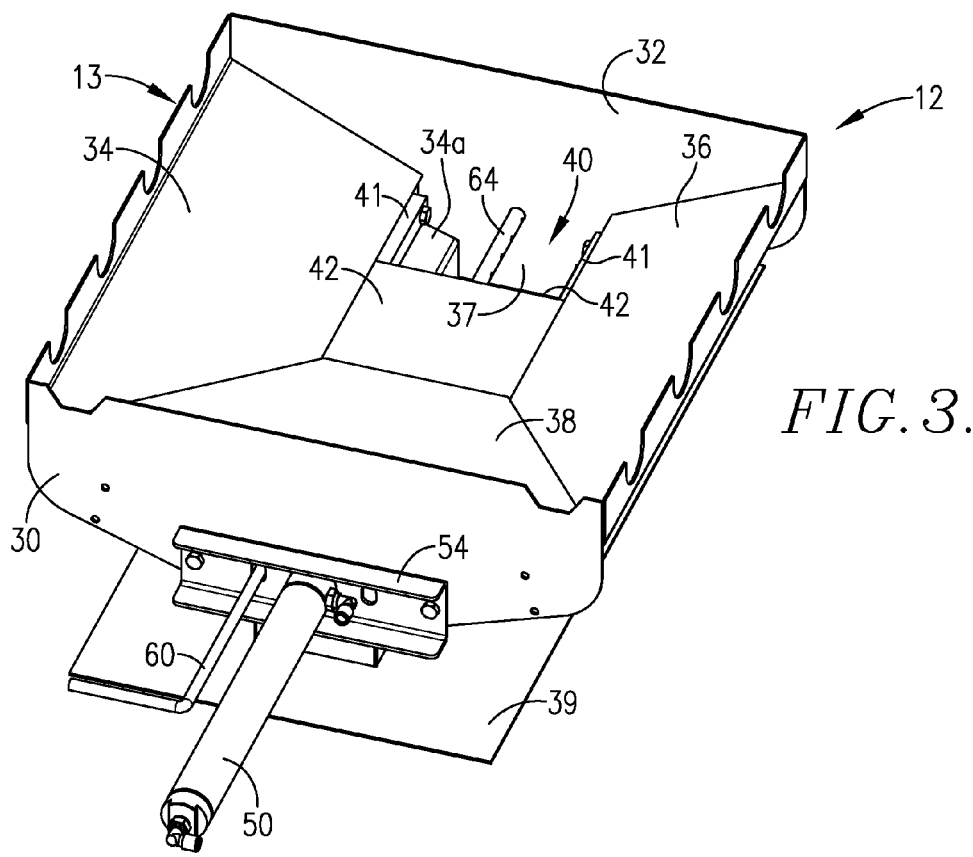
FIG. 3 is a perspective view of the metering gate assembly, viewing from the drive end thereof.
Figure 4:
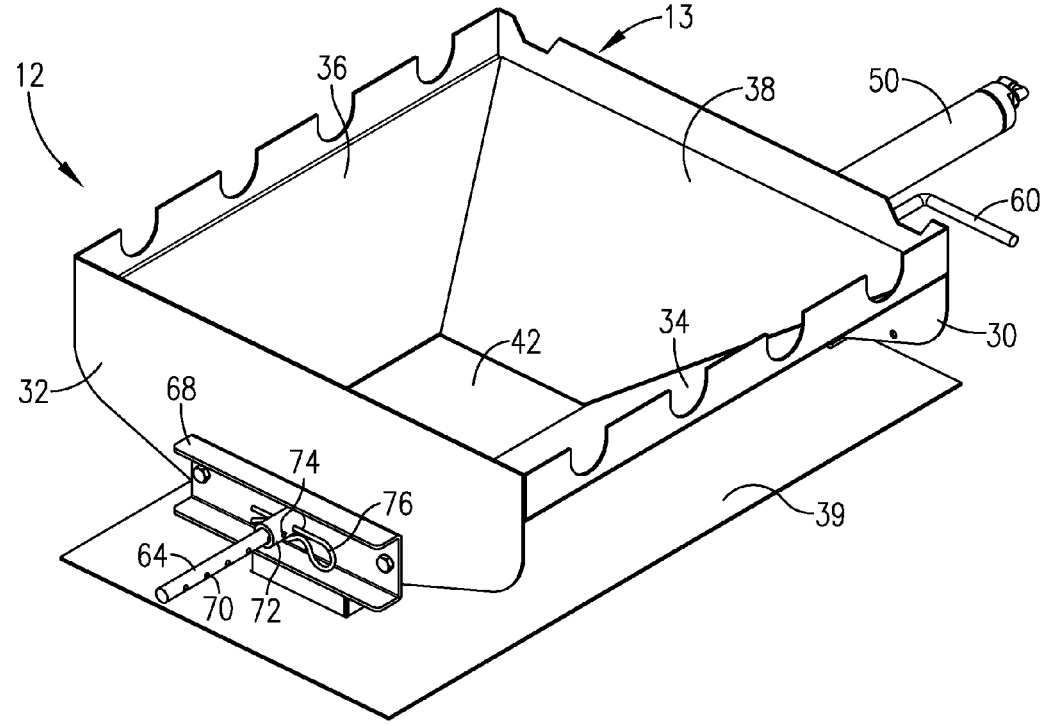
FIG. 4 is a perspective view of the metering gate assembly, viewing from the opposite end of FIG. 3 and illustrating the adjustment end of the assembly.

The metering gate assembly 12 includes a hopper 13 secured to frame 26 by connectors 28 and is situated directly beneath opening 20 and gate assembly 22. The hopper 13 includes a pair of upright, opposed end walls 30 and 32, and a pair of opposed, downwardly converging sidewalls 34 and 36 connected to the end walls 30, 32. The side walls 34, 36 have depending, stepped lower walls 34a, 36a cooperatively defining a seed delivery channel 37. The hopper also has an inclined wall 38 extending from end wall 30 and secured to sidewalls 34, 36. A slotted, rectangular, circumscribing flange plate 39 is secured to and extends outwardly from the lower ends of the flange walls 34a, 36a. As best seen in FIGS. 2-4, the walls 30-38 cooperatively define a quadrate (here rectangular) seed output passageway 40 communicating with channel 37.

A pair of side rail bearings 41 are respectively secured to the upper ends of the lower walls 34a, 36a below seed output passageway 40. A slidable, plate-like gate member 42 is located atop the bearings 41 at the level of seed output passageway 40 and is shiftable in a fore and aft direction thereon, as will be explained. The member 42 is substantially rectangular in plan, having rectilinear forward and rearward margins 44, 46 (FIG. 5) and parallel side margins 47.

A shifting mechanism 48 is operably coupled with the gate member 42 in order to effect selective shifting thereof between a fully closed position closing the seed output passageway 40 (FIG. 6), and an open position permitting flow of seed from the output passageway 40 and channel 37 (FIG. 7). The mechanism 48 includes a double-acting piston and cylinder assembly 50 having an extensible rod 52. The assembly 50 is mounted on end wall 30 by means of channel bracket 54. The outboard end of rod 52 is secured to a fixture 56 mounted on the underside of gate member 42, by means of a clevis 58. Operation of the assembly 50 serves to move the gate member 42 in forward and rearward directions. An L-shaped manual operation rod 60 extends through bracket 58 and end wall 30, and is secured to the fixture 56.

Figure 5:
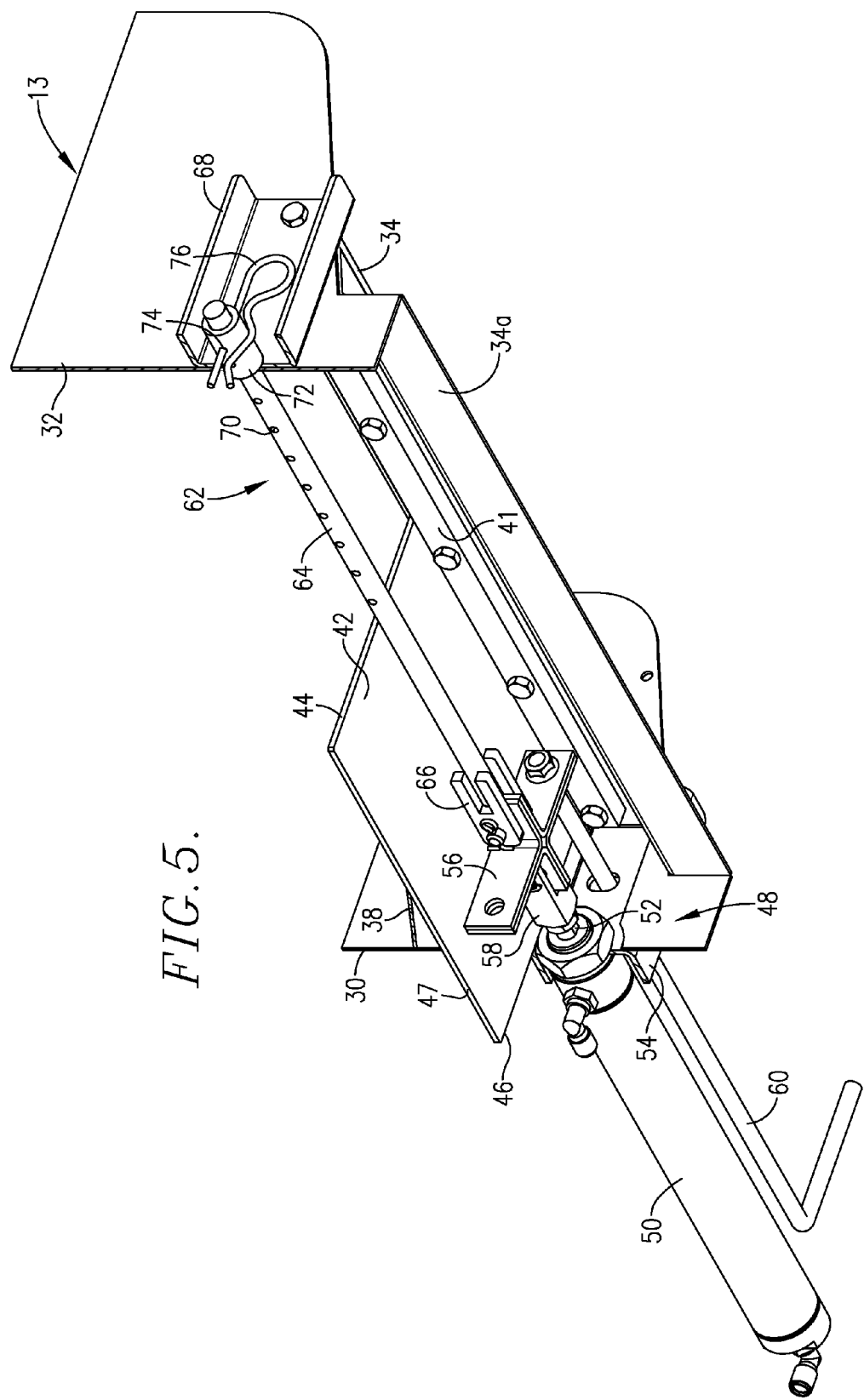
FIG. 5 is a fragmentary, bottom perspective view with portions of the gate assembly hopper broken away in order to illustrate the components of the metering gate assembly beneath the slide plate thereof.

The gate assembly 12 further includes apparatus 62 operably coupled with the gate member 42 in order to limit the travel of the latter between the closed position and a plurality of different open positions. The apparatus 62 comprises an elongated tubular rod 64 secured to fixture 56 by means of clevis 66. The rod 64 extends from clevis 66 toward and through end wall 32 and a channel bracket 68 affixed to the outer face of the end wall. The rod 62 has a series of axially spaced apart, lateral through openings 70 along the length of the rod between the forward margin 44 of gate member 42 and end wall 32 (FIG. 5). The outboard end of rod 62 extends beyond bracket 68 and is equipped with a slidable tubular collar 72 having lateral through openings 74 designed to register with any of the rod openings 70. A hairpin clip 76 is also provided which serves to secure the collar 72 to the rod 64 at a selected position.

In use, the metering gate assembly 12 would normally be in its fully closed position, illustrated in FIG. 6, and the plate 24 would likewise be closed so as to minimize the load upon assembly 12. In this position, the rod 64 is extended to its fullest extent beyond end wall 32, and the gate margin 44 is in abutting contact with end wall 32. If the collar 72 is not employed, the gate member will be shifted to the full-open position thereof, just as in the prior art. However, if the collar 72 is utilized the size of the seed passageway 40 can be varied. In order to accomplish this, the collar is moved so that an opening 74 thereof comes into registry with one of the rod through openings 70, and the collar 72 is attached by means of the clip 76. In this condition, retraction of the piston rod 52 and rod 64 is limited by virtue of the abutment between the end of collar 72 and bracket 68, so as to reduce and determine the size of the seed output passageway 40.

It will be appreciated that in any position of gate member 42, the corresponding seed output passageway 40 is quadrate in plan configuration. This is because of the rectilinear front margin 44 of gate member 42, the parallelism of the lower walls 34a, 36a, and the upright end wall 32. It has been found that such quadrate openings give a more accurate flow rate of seed. Hence, accurate seed delivery count can be achieved simply by measuring the time that gate member 42 is opened at a given position.

In the event that the piston and cylinder assembly 50 is inoperative, or for any other reason, shifting of the gate member 42 can be effected manually by grasping rod 60 and moving the gate member. The same motion limiting through use of the apparatus 62 can also be employed in the manual mode.

Once seed is delivered from the gate assembly 12, it may be collected by any convenient means. For example, as shown in FIGS. 1 and 2, the gate assembly 12 is positioned atop a conveyor unit 80, in this case including a box-like housing 82 having a central, uppermost, axially extending passageway 84 in communication with delivery channel 37 and engaging the flange wall 39. A depending conveyor support 86 also extends along the length of housing 82 and supports the upper run of a conventional conveyor belt 88. The conveyor belt 88 is of course powered by conventional means (not shown).

While providing an accurate and reproducible flow rate of seed is of prime importance in the invention, another significant feature thereof is that the metering gate assembly 12 can be retrofitted onto existing seed bins without requiring any significant alteration of the bins. As pointed out above, such retrofitting involves only the modification of an existing metering gate assembly to include the motion-limiting apparatus 62.

It will be appreciated that the mechanism 48 and apparatus 62 can take a variety of different forms, and are not limited to the exemplary embodiment described herein. For example, an electrical or hydraulic drive motor could be used in lieu of the assembly 50, and other motion-limiting arrangements may be devised to create differently sized seed passageways 70.

We claim:

1. The combination comprising:
   an upright seed bin presenting a lower outlet end;
   a primary delivery gate located above said lower outlet end and shiftable between a closed position preventing flow of seed from the outlet end, and a plurality of open positions allowing flow of seed from the outlet end;
   a metering gate assembly operably coupled with said bin and including—
      a hopper having an upper end in communication with said lower outlet end of said bin, and a lower output end;
      a slidable metering gate member oriented for selective sliding movement between a fully closed position preventing flow of seed from said lower output end, and an open position presenting an open passageway permitting flow of seed from the lower output end,
      mechanism operably coupled with said metering gate member in order to slidably move the metering gate member between said closed and open positions; and
      apparatus operably coupled with said metering gate member in order to determine the travel of said metering gate member between said fully closed position and a plurality of open positions presenting respective, differently sized open passageways, each of said open passageways being substantially quadrate in plan configuration.

2. The combination of claim 1, said mechanism comprising a piston and cylinder assembly having a shiftable piston rod operably connected with said metering gate member.

3. The combination of claim 1, said metering gate member having a rear margin and an opposed, outer, forward margin, said apparatus comprising:

an elongated rod secured to said metering gate member and extending forwardly from the forward margin thereof, said rod and metering gate member being selectively shiftable in a forward direction until the forward margin of the slidable gate member reaches said closed position, and being selectively shiftable in a rearward direction in order to move the slidable gate member to any one of said open positions;

a bracket slidably receiving the forward end of said rod and having a series of axially spaced apart connection elements; and a coupler operable to be secured to said rod at any one of said connection elements, said coupler operable to engage said bracket when said rod and metering gate member are shifted rearwardly, in order to selectively limit the extent of opening of said slidable gate member.

4. The combination of claim 3, said connection elements comprising a series of openings through said rod, said coupler comprising an apertured collar designed to align with any one of said rod openings, and a clip extending through said collar aperture and a respective rod opening.

5. The combination of claim 3, including a clevis assembly operably interconnecting said metering gate member and the end of said rod adjacent the metering gate member.

6. The combination of claim 1, including a manually operable rod secured to said metering gate member in order to allow manual sliding movement of the metering gate member.

7. A metering gate assembly adapted to be operably coupled with the lower outlet end of an upright seed bin, said assembly comprising:

a hopper having an upper end in communication with said lower outlet end of said bin, and a lower output end;

a slidable metering gate member oriented for selective sliding movement between a fully closed position preventing flow of seed from said lower output end, and an open position presenting an open passageway permitting flow of seed from the lower output end, mechanism operably coupled with said metering gate member in order to slidably move the metering gate member between said closed and open positions; and apparatus operably coupled with said metering gate member in order to determine the travel of said metering gate member between said fully closed position and a plurality of open positions presenting respective, differently sized open passageways, each of said open passageways being substantially quadrate in plan configuration.

8. The gate assembly of claim 7, said mechanism comprising a piston and cylinder assembly having a shiftable piston rod operably connected with said metering gate member.

9. The gate assembly of claim 7, said metering gate member having a rear margin and an opposed, outer, forward margin, said apparatus comprising:

an elongated rod secured to said metering gate member and extending forwardly from the forward margin thereof, said rod and metering gate member being selectively shiftable in a forward direction until the forward margin of the slidable gate member reaches said closed position, and being selectively shiftable in a rearward direction in order to move the slidable gate member to any one of said open positions;

a bracket slidably receiving the forward end of said rod and having a series of axially spaced apart connection elements; and a coupler operable to be secured to said rod at any one of said connection elements, said coupler operable to engage said bracket when said rod and metering gate member are shifted rearwardly, in order to selectively limit the extent of opening of said slidable gate member.

10. The gate assembly of claim 9, said connection elements comprising a series of openings through said rod, said coupler comprising an apertured collar designed to align with any one of said rod openings, and a clip extending through said collar aperture and a respective rod opening.

11. The gate assembly of claim 9, including a clevis assembly operably interconnecting said metering gate member and the end of said rod adjacent the metering gate member.

12. The gate assembly of claim 9, including a manually operable rod secured to said metering gate member in order to allow manual sliding movement of the metering gate member.

13. A metering gate assembly adapted to be operably coupled with the lower outlet end of an upright seed bin, said assembly comprising:

a hopper having an upper end in communication with said lower outlet end of said bin, and a lower output end;

a slidable metering gate member oriented for selective sliding movement between a fully closed position preventing flow of seed from said lower output end, and an open position presenting an open passageway permitting flow of seed from the lower output end, mechanism operably coupled with said metering gate member in order to slidably move the metering gate member between said closed and open positions; and apparatus operably coupled with said metering gate member in order to determine the travel of said metering gate member between said fully closed position and a plurality of open positions presenting respective, differently sized open passageways.

14. The metering gate assembly of claim 13, each of said open passageways being substantially quadrate in plan configuration.

* * * * *